United States Patent
Scamardo et al.

(10) Patent No.: US 12,456,120 B1
(45) Date of Patent: Oct. 28, 2025

(54) SYSTEMS AND METHODS FOR MANAGING COMBINATIONS OF VERIFICATION DATA AND TRANSACTION DATA

(71) Applicant: United Services Automobile Association (USAA), San Antonio, TX (US)

(72) Inventors: Jennifer Anne Scamardo, Frisco, TX (US); Bradford James Kupka, Richardson, TX (US); Brett Andrew Walker, Plano, TX (US); Dwayne Phillip Wilson, Crossroads, TX (US); Patrick Emmanuel Gaston, Frisco, TX (US); Timothy Benjamin Czerlinsky, Dallas, TX (US); Kabita Bhandari, Frisco, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/810,078

(22) Filed: Jun. 30, 2022

(51) Int. Cl.
*G06Q 20/40* (2012.01)
*G06Q 20/22* (2012.01)

(52) U.S. Cl.
CPC ......... *G06Q 20/401* (2013.01); *G06Q 20/227* (2013.01); *G06Q 20/4093* (2013.01)

(58) Field of Classification Search
CPC .................................................. G06Q 20/401
USPC ........................................................... 705/44
See application file for complete search history.

(56) References Cited

U.S. PATENT DOCUMENTS

2019/0130094 A1* 5/2019 Votaw ................... G06F 21/552
2020/0322335 A1* 10/2020 V B H ................ H04L 63/0428

* cited by examiner

*Primary Examiner* — Cho Yiu Kwong
(74) *Attorney, Agent, or Firm* — Fletcher Yoder, P.C.

(57) ABSTRACT

A technique for managing verification data, such identity information, membership information, and personal information, and the like, is provided. The verification data management system may receive an indication of a transaction and select a combination of a transaction card, such as a credit card, debit card, and the like, and/or multiple types of verification information for executing the transaction. Further, the verification data management system may generate a transaction output, which may include causing a display to display a graphical user interface that informs the user of the selected combination.

17 Claims, 6 Drawing Sheets

SYSTEMS AND METHODS FOR MANAGING COMBINATIONS OF VERIFICATION DATA AND TRANSACTION DATA

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A user may own or otherwise manage multiple financial accounts that are each linked to or associated with one or more transaction cards. In general, transaction cards may include credit cards, cash cards, gift cards, and/or debit cards. In any case, the user may use a first transaction card of the cards to execute a purchase or transaction. Furthermore, the user may use verification information, such as identity information (e.g., passwords, person identification numbers, social security numbers), personal information (e.g., an address associated with the user, answer's to security questions, product order numbers), and/or membership information (e.g., insurance numbers, account identification numbers, bank account numbers), to authorize the purchase or transaction. However, managing the users multiple transaction cards and the verification information may be difficult. Accordingly, the user may miss out on certain transactions or may be prevented from making such transactions.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, the present disclosure relates to a system. The system includes a processor and communication circuitry configured to be in communication with a retail transaction system. The system also includes a tangible, non-transistor, computer readable medium, including instructions that cause the processor to receive an indication of a transaction corresponding to a user. The instructions also cause the processor to receive user activity data corresponding to the user. Further, the instructions cause the processor to access stored card data, wherein the stored card data comprises data for a plurality of transaction cards associated with the user. Even further, the instructions cause the processor to determine verification information based on the user activity data. Even further, the instructions cause the processor to determine a combination of a transaction card of the plurality of stored transaction cards and particular verification information for executing the transaction from the verification information based on the user activity data. Even further, the instructions cause the processor to generate a transaction output based on the combination. Further still, the instructions cause the processor to instruct the communication circuitry to communicate the transaction output to an electronic device.

In one embodiment, the present disclosure relates to a method. The method includes storing card information for a plurality of cards in a memory of a storage component. The method also includes storing verification information for a plurality of verification information in the memory of the storage component. Further, the method includes storing a plurality of combinations of information comprising the card information for the plurality of cards, the verification information of the plurality of verification information, or both. Even further, the method includes receiving instructions to select a combination of information of the plurality of combinations of information. Even further, the method includes displaying an indication of the selected combination of information on a display of an electronic device. Further still, the method includes providing the combination of information via the memory at a next transaction.

In one embodiment, the present disclosure relates to a system. The system includes a processor and a tangible, non-transitory, computer-readable medium, including instructions that cause the processor to receive an indication of a transaction corresponding to a user. The instructions also cause the processor to determine a transaction type of the transaction. Further, the instructions cause the processor to retrieve a plurality of combinations of information, wherein each combination of the plurality of combinations of information includes data from one or more transaction tokens and data from one or more verification tokens. Even further, the instructions cause the processor to select a combination of information from the plurality of combinations of information based on the transaction type. Even further, the instructions cause the processor to generate a transaction output based on the selected combination of information. Further still, the instructions cause the processor to adjust operation of an electronic device based on the transaction output.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates to techniques for managing combinations of user data, such as transaction and authentication data. More specifically, the present disclosure relates to multifunctional transaction cards for executing a transaction and transmitting data associated with a particular combination of cards, such as authorization data and authentication data, for executing transactions.

As mentioned above, a user may own or manage multiple financial accounts and each financial account may be associated with one or more physical transaction cards (e.g., credit cards, cash cards, gift cards, debits cards) that in turn have associated account information, profile information, etc. Furthermore, the user may manage multiple types of verification information for executed transactions using at least one of the physical transaction cards. As described above, the verification information may include physical cards, verification data (e.g., combinations of letters and numbers such as account numbers, group numbers for insurance, confirmation numbers), and/or electronic documents (e.g., e-tickets, e-insurance cards, vaccination cards). For example, the verification information may include identity information (e.g., passwords, personal identification numbers, social security numbers), personal information (e.g., an address associated with the user, answer's to security questions, product order numbers), and/or membership information (e.g., insurance numbers, account identification numbers, bank account numbers), and other information that may be used to validate or execute transactions.

In any case, the user has to manage storing and securing multiple physical and/or electronic cards, verification information, and determining which combination of transaction cards, verification information, or both, is appropriate for particular transactions. In certain cases, a user may have an event (e.g., an appointment, a trip, a concert, a conference) that requests that user bring in certain documents, such as verification information (e.g., a membership card), a credit card, and/or an electronic ticket, that the user infrequently carries. While the certain of these documents, such as the electronic ticket may be stored in an email and the particular credit card may be used specifically for medical purchases, they may not be readily available to the user (e.g., the credit card may be stored away in a container other than the user's daily wallet). Thus, the desired transaction cannot occur when one or both of the electronic ticket and the credit card are not present.

Furthermore, it may be desirable to use certain transaction cards instead of others due to special offerings associated with the transaction card and/or account information (e.g., a balance associated with a card). For example, a credit card may offer a "cash back" rewards program for purchases from a particular vendor, such as a particular department store. In certain instances, such as when a new vendor is added to a list corresponding to the rewards program, a user may not be aware that the new vendor is added to the list. As such, the user may utilize a transaction card other than the credit card that may provide the user financials rewards (e.g., points, miles, cash back, and the like). Additionally, a user may utilize a transaction card and inadvertently incur a financial penalty for using the transaction card associated with a financial account having too few funds for the transaction and/or spend over a credit limit. Furthermore, certain vendors (e.g., department stores, airport clubs, and the like) may not permit access to the user if the user does not have verification information, such as a pass or membership ID card, available. Accordingly, it is presently recognized that it may be efficient to develop systems for selecting between combinations of multiple transaction cards and/or verification information for executing certain transactions with certain vendors. As discussed in more detail herein, such techniques may provide a financial benefit to a user and improve the efficiency associated with purchasing goods or services (e.g., by pushing or providing authorization data used to execute a purchase). In comparison with the processing required to assemble information separately, as is traditionally done, present embodiments may improve on computer operation by consolidating efforts and utilizing more efficient processing.

Accordingly, the present disclosure relates to a verification data management system for improving the efficiency of transactions and/or providing certain financial benefits to the user. In general, the verification data management system may determine combinations of transaction cards and/or verification information to use to execute (e.g., executing a purchase) or facilitate (e.g., verifying a user's identity as the user attempts to board a flight) an event associated with a transaction. For example, the verification data management system may determine a vendor associated with a transaction and/or an event corresponding to the transaction. The transaction may be a previous transaction (e.g., the user previously purchased an airline ticket, concert ticket, or club pass for an event (e.g., a flight, a concert, visiting a club) occurring during a time period subsequent to the purchase). As another non-limiting example, the transaction may be a potential transaction (e.g., the user has entered a store and/or is at a point of sale device to make a purchase). Additionally or alternatively, the disclosed techniques may utilize user activity data (e.g., location information corresponding to the user's current location, a time period corresponding to a potential transaction, and/or a type of good to be purchased) to determine the particular transaction card to purchase the good or service.

In any case, the verification data management system may determine the vendor associated with the transaction. Furthermore, the verification data management system may determine a combination of transaction cards and/or verification information to be utilized for the transaction and generate a transaction output based on the combination. In general, the combination includes at least two combinations of information, such as transaction card information and verification information (e.g., zero transaction card information and at least two verification information, at least two transaction card information and zero verification information, or at least one transaction card information and at least one verification information). In some embodiments, the transaction output may include causing a user computing device (e.g., a mobile phone, a tablet, a laptop, an e-reader) to download at least a portion of the combination using data from suitable applications (e.g., a confirmation number for a flight within an email in an email application, keywords in a browser history indicating that the user is likely to visit the department of motor vehicles, and the like). In some embodiments, the verification data management system may cause a graphical user interface (GUI) or other display to display a notification indicating the determined transaction card and/or automatically use the determined transaction card to purchase the good or service (e.g., outputting the authorization information to a terminal used for making the transaction). In this way, the disclosed techniques may improve the efficiency of transactions by ensuring that the combination of verification information and/or transaction cards (e.g., a first combination of multiple verification information, a second combination of verification and transaction cards) is ready to transmit to facilitate or execute a previous transaction or a pending transaction.

Figure 1:
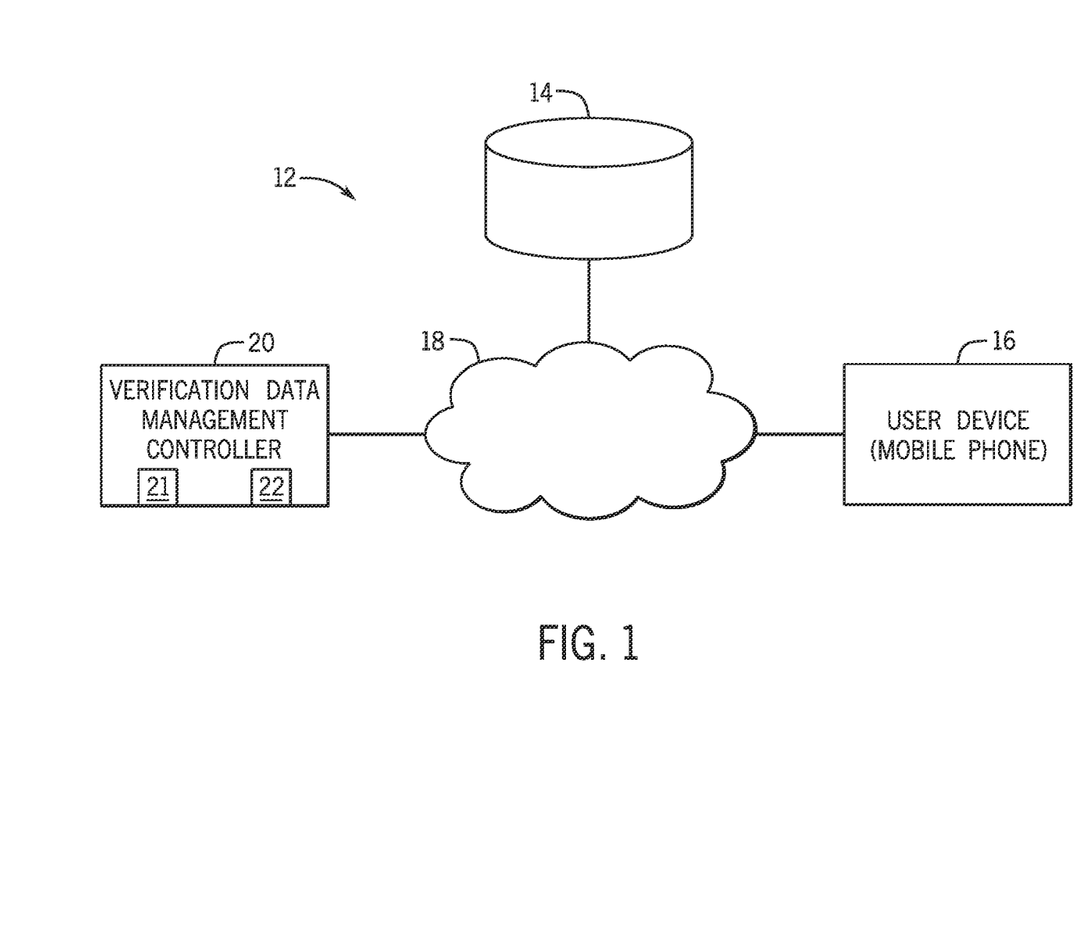
FIG. 1 illustrates a block diagram of a system including a verification data management system, in accordance with embodiments described herein.

By way of introduction, FIG. 1 is a block diagram of a verification data management system 12, database 14 (representative of one or more databases), and a user computing device 16 (representative of one or more user computing devices), which may be communicatively coupled over a network 18, in accordance with present embodiments. In some embodiments, the verification data management system 12 may include a smart chip or a transaction chip (e.g., a Europay MasterCard Visa Chip) or otherwise is capable of communicating transaction information (e.g., a transaction authorization code) and/or retrieving account information associated with stored card information of one or more cards. Indeed, the data management system 12 may include memory 21 and a processor 22 (e.g., one or more processors 22) that provide such functionality.

The verification data management system 12 may be implemented using a controller 20 having the processor 22, which may be generally capable of receiving an indication of a potential transaction, determining or selecting a transaction card from stored card information (e.g., stored transaction card information in the memory 21, the user device 16, and/or the database 14) to use for executing the potential transaction, and transmitting a transaction output based on the selected or determined transaction card.

At least in some instances, the account information may be stored in database 14 that is accessible by the controller 20. As such, the verification data management system 12 may query the databases 14 or other storage component based on the data to retrieve additional data to generate a transaction output. For example, the databases 14 may be associated with one or more financial institutions.

Keeping the foregoing in mind, the verification data management system 12 may assist a user in a number of scenarios. For example, a user may have a doctor's appointment with a new doctor and, as such, may need to bring verification information, such as a health insurance card, as well as a driver's license and a transaction card, such as a credit card and/or a health savings account (HAS) card. The processor 22 of the verification data management system 12 may determine whether electronic versions of one or more of the verification information and the transaction card(s) are available to display using a user's mobile device (e.g., user device 16). As another non-limiting example, a user entering a store wishing to pay for a good or service may attempt to pay using a first transaction card. However, a processor of the verification data management system 12 may retrieve account information associated with one or more financial institution and determine that a particular financial institution is providing bonus financial rewards if the user uses a particular transaction card. As such, the processor 22 may cause a display of a device associated with the user (e.g., the user device 16) to display a notification indicating the particular transaction card. In either example, if a user is attempting to use a transaction software, the processor may cause the display to display a notification indicating the particular transaction card and verification information. For example, the processor may cause a display to provide one or more selectable features (e.g., buttons) that enable a user to provide input indicating whether to proceed with purchasing the good with a first transaction card or the transaction card associated with the bonus financial rewards. In some embodiments, the processor may transmit the notification using a text message, email, or other software application having a messaging platform.

Figure 2:
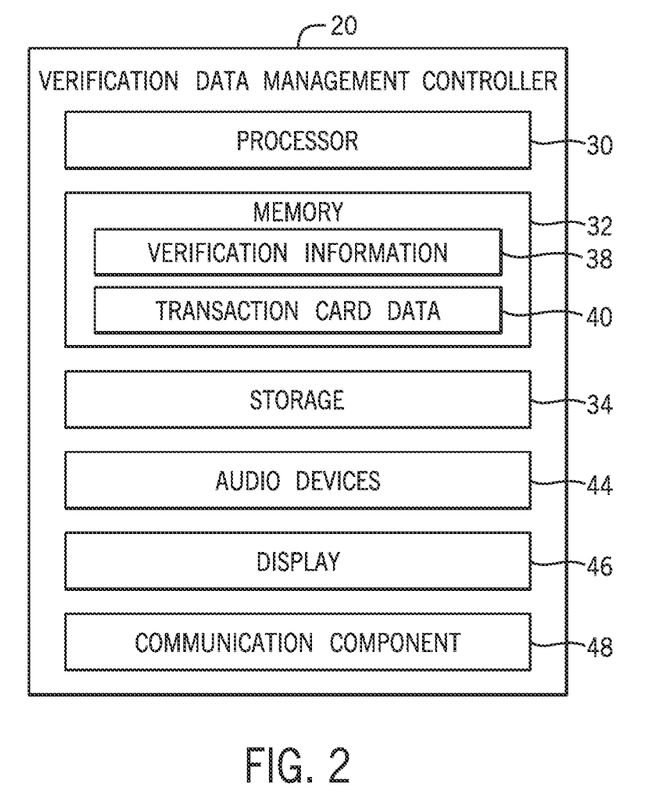
FIG. 2 illustrates a block diagram of a computing system that may be used in conjunction with the system of FIG. 1, in accordance with embodiments described herein.

To perform one or more operations described herein, the verification data management system 12 may include various types of components that may assist the verification data management system 12 in performing the operations described below. For example, as shown in FIG. 2, the verification data management controller 20 may include a processor 30, a memory 32 and/or storage 34, audio devices 44, a display 46 and a communication component 48. In some embodiments, all of the features of the verification data management system controller 20 are not integrated into a single housing. For example, the audio devices 44 and display 46 may be aspects of a separate device that are controlled or accessed by the processor 30. Specifically, for example, the audio devices 44 and the display 44 may be features of a user's smart phone that can be utilized by or as part of the verification data management controller 20. In some embodiments, the verification data management controller 20 may be entirely resident on a device, such as a laptop computer or a smart phone.

The processor 30 may be any type of computer processor or microprocessor capable of executing computer-executable code. The processor 30 may also include multiple processors that may perform the operations described below. The communication component 48 may be a wireless or wired communication component that may facilitate communication between various components of the verification data management system 12 such as the databases 14, the user computing device 16, and various other computing systems via the network 18, the Internet, or the like.

The memory 32 and the storage 34 may be any suitable articles of manufacture that can serve as media to store processor-executable code, data, or the like. These articles of manufacture may represent computer-readable media (e.g., any suitable form of memory or storage) that may store the processor-executable code used by the processor 30 to perform the presently disclosed techniques. As used herein, applications may include any suitable computer software or program that may be installed onto the verification data management system 12 and executed by the processor 30.

The memory 32 and the storage 34 may represent non-transitory computer-readable media (e.g., any suitable form of memory or storage) that may store the processor-executable code used by the processor 30 to perform various techniques described herein. It should be noted that non-transitory merely indicates that the media is tangible and not a signal. As illustrated, the memory 32 stores verification data 38 and transaction card data 40.

As described herein, the verification may generally include identity information (e.g., passwords, personal identification numbers, driver's license number, birth certificate data, a passport number, a social security number, a marriage certificate), personal information (e.g., an address associated with the user, answer's to security questions, product order numbers, vaccination records), and/or membership information (e.g., insurance numbers, account identification numbers, bank account numbers), to authorize the purchase or transaction. For example, the verification data 38 may include data corresponding to an insurance card (e.g., automobile insurance, health insurance, dental insurance), such as a group number, a member identifier (ID), and/or an expiration date of the insurance card. As another non-limiting example, the verification data 38 may include data corresponding to a birth certificate, such as a date of birth (e.g., month, date, and year), a location of birth (e.g., a city, a state/province, a country), and/or the user's full name.

As described herein, the transaction card data 40 may generally include data indicating stored transaction cards associated with a user (e.g., a person, a family, or an enterprise). For example, the memory 32 may store account information and/or transaction data, and the processor 30 may communicate with terminal devices to receive indications of potential actions and/or communicate transaction data and/or authorization data with the terminal devices to facilitate the transaction.

The audio devices 44 may include microphones or other audio input devices capable of receiving verbal queries or commands from a user. For example, the verbal queries may be directed to identify queries regarding a particular transaction card to use, such as 'are there funds available on card X', 'are there any special offers for card Y?' Additionally, the verbal queries may be directed to previous transactions, such as 'we need a taxi for the airport, tomorrow,' 'I have a flight to catch tomorrow,' 'I recently moved here and I am going to the DMV next Thursday to obtain a driver's license.'

The display 46 may depict visualizations associated with software or executable code being processed by the processor 30. In one embodiment, the display 46 may be a touch display capable of receiving inputs from a user of the verification data management system 12. The display 28 may be any suitable type of display, such as a liquid crystal display (LCD), plasma display, or an organic light emitting diode (OLED) display, for example. Additionally, in one embodiment, the display 28 may be provided in conjunction with a touch-sensitive mechanism (e.g., a touch screen) that may function as part of a control interface for the verification data management system 12.

In addition to the verification data management system 12, the user computing device 16, as well as other suitable computing devices described herein may include the components described above for the verification data management system 12. It should be noted that the components described above with regard to the verification data management system 12 are exemplary components and the verification data management system 12 may include additional or fewer components than shown.

The controller 20 or other components of the system 12 may include one or more computing devices of any suitable type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to a suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by special purpose logic circuitry, e.g., an FPGA (field programmable gate array), an ASIC (application specific integrated circuit), or the like. Further, apparatuses may also be employed to implement disclosed processes and logic flows in accordance with present embodiments.

Processors suitable for the execution of a computer program include, by way of example, both general and special purpose microprocessors, and/or processor(s) of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI (user interface) or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Included in the system is a user computing device 16 from which the initial query regarding one or more financial accounts may be submitted. Additionally, the user computing device 16 may be used for displaying notifications and/or alerts generated by the verification data management system 12. The user computing device 16 may be a general-purpose personal computer, a laptop computer, a tablet computer, a mobile computer, a mobile device (e.g., cell phone), etc. The verification data management system 12 may be in communication with the user computing device 16 and configured to receive the initial query via an interface of the user computing device 16.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Figure 3:
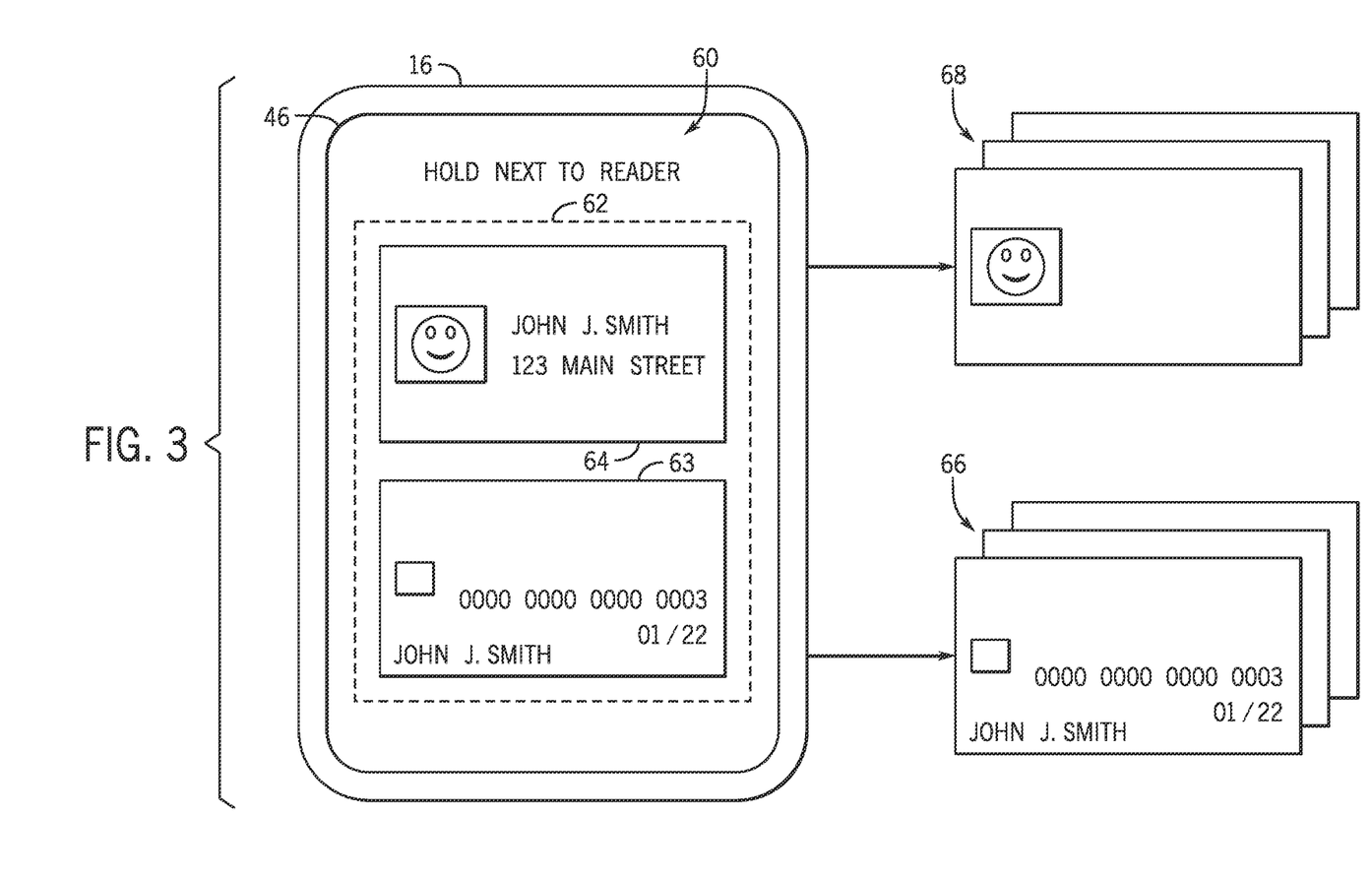
FIG. 3 illustrates a schematic diagram of the verification data management system of FIG. 1, in accordance with embodiments described herein.

FIG. 3 shows a schematic diagram illustrating an example embodiment of a verification data management controller 20 that may be utilized in the verification data management system 12 described with respect to FIG. 1. In this illustrated embodiment, the verification data management system 12 includes the user computing device 16 (e.g., a cell phone) showing a display layout 60 of a graphical user interface (GUI) on the display 46 of the user computing device 16. In general, the display layout 60 depicts an interface for managing a combination of transaction cards and verification information for executing a transaction. Certain components of the system 12 (or even all of the components) discussed with respect to FIGS. 1-2 may additionally or alternatively be present on the user computing device 16. For example, the user computing device 16 may include a processor, memory, display, etc., and portions of the verification data management system 12 discussed with respect to these elements may also apply to similar elements that may additionally or alternatively be present on the user computing device 16.

In the illustrated embodiment, the display layout 60 depicts a combination 62 including transaction card visualization 63 (e.g., a credit card) and a verification information visualization 64 (e.g., an identification card). In general, the transaction card visualization 63 depicts a particular transaction card of multiple transaction cards 66 that correspond to the stored transaction card data 40 described with respect to FIG. 2. In a generally similar manner, the verification information visualization 64 depicts a particular verification information card of multiple verification information cards 68 that correspond to the stored verification data 38 described with respect to FIG. 2. In this way, the combination 62 including the transaction card visualization 63 and the verification information card visualization 64 may inform a user of the information (e.g., the transaction card and the verification information) that may be used for a transaction. It should be noted that while reference is made to cards (e.g., the transaction cards 66, and the verification information cards 68), other tokens may be referenced in accordance with present embodiments. For example, the verification information cards 68 may broadly represent any of various tokens for verification (e.g., an email, a birth certificate, a utility bill).

In some embodiments, the GUI may include one or more selectable features to that enable the combination 62 to be modified, such as by adding, removing, or changing the transaction card and/or verification information. As such, user selection of the one or more selectable features can trigger activity on-board the user computing device 16 to change a displayed image (e.g., change the transaction card visualization 63 and/or the verification information card visualization 64), activate a haptic feedback, change stored settings, or transmit a communication based on the selection.

Additionally or alternatively, the display 46 may generally display information, notifications, and/or alerts related to the multiple transaction cards 66 and/or the multiple verification information cards 68. That is, the processor 30 (not shown) of the verification data management controller 20 may be capable of causing the display 46 to display the notifications and/or alerts based on the operations described herein. For example, if the processor 30 determines that a particular transaction card 66 has expired or has incorrect information (e.g., the user mistakenly entered incorrect information associated with the card), the processor 30 may cause the display 46 to display an alert or indication that indicates that the transaction card 66 has expired or has incorrect information. For example, the processor 30 may determine that a residential address indicated by the verification information card 68 corresponding to the verification information visualization 64 does not match a residential address corresponding to the transaction card visualization 63. As another non-limiting example, the processor 30 may determine that the verification information visualization 64 corresponds to an insurance card that is expired or with a company that no longer provides the user insurance coverage. As such, the processor 30 may output a notification and/or query (e.g., automatically or based on a user selection) an application (e.g., an email application) stored on the user computing device 16 and identify an updated insurance card. In this way, the verification data management system 12 may inform a user of a particular combination of transaction cards 66 and/or verification information card 68 used to execute a transaction as well as aid the user in managing the transaction cards 66 and/or the verification information card 68.

In any case, when the user computing device 16 executing an application is read at a retail point of service location, the combination 62 is provided to the reader and the transaction is associated with the selected first transaction card 66. In a specific example, the selection of the particular combination causes the selection to be communicated to the controller 20 of the system 12. For example, the communication may be mediated by onboard communication circuitry 48, which can either wirelessly communicate with the controller via a network 18 or transmit a communication to a nearby device, such as a user mobile device or a retail point of service reader having receivers. In such an example, the receiving device can pass the communication along to the controller 20.

In another embodiment, the card selection can be made via a separate user computing device 16, e.g., a different mobile device, a tablet, a desktop computer, or otherwise, operating a software application in communication with the system 12. Once selected, a communication is transmitted to the controller 20, which in turn generates instructions to cause the application of the user computing device 16 to update.

The selection of a particular card and/or verification information (e.g., a combination including one or more transaction cards and/or one or more verification information cards) can cause an update of memory settings on the verification data management controller 20 and cause a display on the display 46 indicative of the selected combination. Further, when the verification data management controller 20 is used at a retail point of sale, the selected card information, and not other card information, is communicated to a retail point of sale device by the verification data management controller 20.

Figure 4:
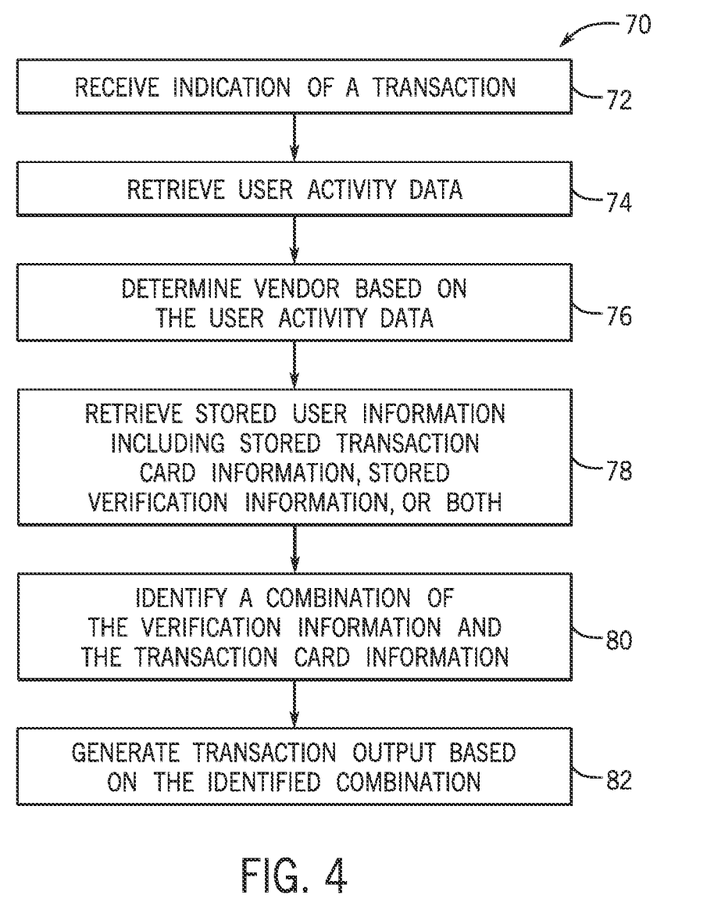
FIG. 4 illustrates a flow diagram for generating a transaction data output, in accordance with embodiments described herein.
Figure 5:
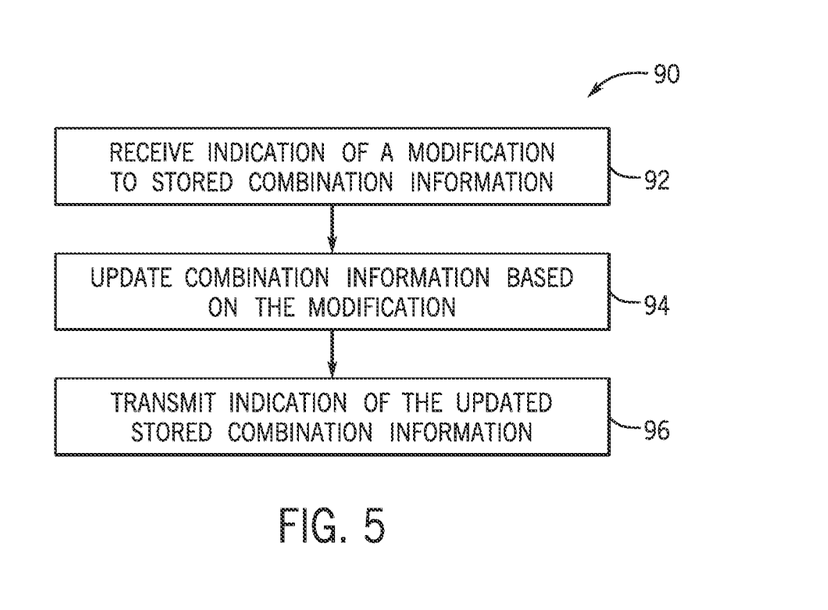
FIG. 5 illustrates a flow diagram for updating verification information, transaction card information, or both, in accordance with embodiments described herein.
Figure 6:
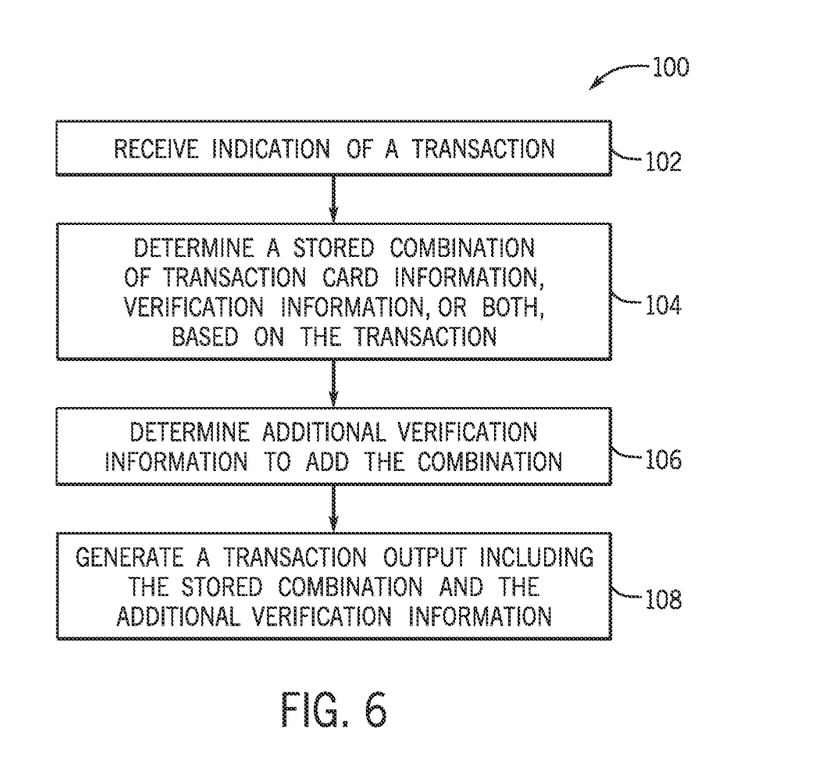
FIG. 6 illustrates a flow diagram for determining additional verification information, transaction card information, or both to add to a stored combination of verification information and transaction card information for executing a transaction, in accordance with embodiments described herein.

With the foregoing in mind, FIGS. 4-6 illustrate flow diagrams of methods that may be performed by the processor 22 of the verification data management system 12, for example, to aid users in various scenarios relating to managing the verification data management system 12.

FIG. 4 illustrates an example process 70 that may be employed by the processor 30 of the verification data management system 12, in accordance with embodiments described herein. For example, the steps of the process 70 may be stored in the memory 32, the storage 34 and/or the memory 58. Before proceeding, it should be noted that the process 70 described below is described as being performed by the processor 30 of the verification data management system 12, but the process 70 may be performed by other suitable computing devices. Although described in a particular order, which represents a particular embodiment, it should be noted that the process 70 may be performed in any suitable order or limited to the illustrated order. Additionally, embodiments of the process 70 may omit process blocks and/or include additional process blocks.

Referring now to FIG. 4, at block 72, the processor 30 receives an indication of a transaction. As mentioned above, the transaction may be a potential transaction, such as a transaction that is about to be executed (e.g., based on an email or calendar item). In such embodiments, the indication may be data transmitted from a terminal and/or the processor 30 detecting a nearby terminal. For example, the processor 30 of the verification data management system 12 may receive the indication in response to a device utilizing the verification data management system 12 (e.g., in an embodiment where the verification data management system 12 is implemented as a software application running on a user computing device 16). In some embodiments, the transaction may be a previously made transaction. In such embodiments, the indication may be a calendar entry, a calendar reminder, or an audio input by the user that indicates an upcoming event (e.g., 'I have a trip tomorrow', 'I'll be out of the office tomorrow', and the like) associated with a previously made transaction.

At block 74, the processor 30 receives user activity data. In general, the user activity data includes data that the processor 30 may use to determine what credit card to use on behalf of the user. For example, the user activity data may include time data indicating a time period corresponding to the potential transaction. For example, the time data may indicate a certain day of the week (e.g., 'Monday', 'Tuesday', or other days of the week) and/or a calendar date (e.g., the 24th of December) corresponding to the potential transaction. As another non-limiting example, the time data may indicate a current time corresponding to the potential transaction (e.g., a purchase at 6:00 am). As another non-limiting example, the user activity data may include location data, such as GPS coordinates, a WiFi being utilized by a user device, an IP address, and the like, that indicate a location of the user corresponding to the potential transaction that was received, which may indicate a store corresponding to the received indication of the potential transaction.

In some embodiments, the user activity data may include calendar data. In general, the calendar data may include a time period (e.g., a date or a time duration) corresponding to an event (e.g., a doctor's appointment, a flight time, a movie screening, and the like). Accordingly, in some embodiments, the indication and the user activity data may be substantially the same. For example, the processor 30 may identify a calendar entry for a future date within a time range (e.g., within 24 hours of a current time, within 2 days of a current time, within 1 week of a current time). Further, the processor 30 may identify one or more keywords (e.g., 'flight', 'hotel', 'concert', 'appointment', or other words indicating an event) or codes (e.g., a 6 digit confirmation number) within the calendar entry. As such, the indication may be a detected calendar entry that includes keywords and/or codes corresponding to a date within a time range.

In some embodiments, the processor 30 may also receive user habit data (e.g. historical data). In general, the user habit data may include generally similar data as the user activity data. However, the user habit data generally includes trends and/or correlations determined by the processor 30 relating to a vendor corresponding to previous transactions and at least one of time data and/or location data. For example, the user habit data may indicate a correlation between a first vendor (e.g. a coffee shop) and a time range (e.g. between 7 AM to 9 AM).

At block 76, the processor determines a vendor corresponding to the received indication of the transaction (e.g., potential or previously made transaction). In general, the processor 30 may utilize the user activity data and/or user habit data to determine the vendor associated with the transaction. For example, and continuing with one of the examples described above, the processor 30 may receive user activity data indicating a time (e.g., a time stamp) corresponding to when the indication of the transaction was received. As such, the processor 30 may compare the time to user habit data indicating one or more time ranges corresponding to certain vendors. As such, if the time corresponding to the transaction is within a time range correlated to purchases with a particular vendor, the processor 30 may determine that the potential transaction involves the particular vendor. As another non-limiting example, the processor 30 may receive user activity data such as a calendar entry that indicates a doctor's appointment associated with the user. As such, the processor 30 may identify keywords in the calendar entry (e.g., 'doctor', 'medical, 'surgery', and the like) and determine that the potential transaction is associated with a medical appointment.

At block 78, the processor 30 retrieves stored card data indicating a plurality of transaction cards associated with the user. In general, the stored card data may include a listing of the plurality of transaction cards, information associated with the transaction cards (e.g., a vendor associated with the transaction card, a transaction card type, an expiration data and the like), and account information associated with the plurality of transaction cards and/or financial accounts of the user (e.g., account balances, income data, spending reports, and the like). That is, card data may include data (not necessarily associated with a card) associated with a financial account (e.g., a credit card or debit card account) that is intended to be accessible for transactions when authorized by a valid user. For example, the processor 30 may access account information associated with one or more transaction cards of the stored card data. That is, the processor 30 may determine certain fiscal considerations associated with the one or more transaction cards, such as an available balance, the end of a pay period, and the like. Accordingly, the processor may select the transaction card having available balance that is below a threshold (e.g. a budget threshold) and/or the transaction card for which a statement period has more recently ended. As another non-limiting example, the processor 30 may access the account information associated with the one or more transaction cards of the stored card data to determine whether there are any special offerings (e.g., sales, increased rewards points and the like) associated with any of the one or more transaction cards and/or corresponding to the time period the potential transaction. Accordingly, the processor 30 may select the transaction card that provides the largest financial benefit to the user. In an instance where multiple cards may have special offerings, the processor 30 may compare the financial benefits provided by the cards, and thus select the transaction card that provides the largest financial benefit to the user.

In some embodiments, the stored card data may include predetermined combinations of verification information and transaction card data. For example, and as described in more detail with respect to FIG. 7, the memory 32 of the verification data management system 12 may store predetermined combinations of verification information and transaction card data and each of the predetermined combinations may be linked with a particular vendor and/or type of transaction (e.g., medical transaction type, department store transaction type, and the like). In some embodiments, the predetermined combinations may be set by a user. For example, in an embodiment where the verification data management system 12 may be an application stored on a memory of a user device, the user may provide inputs indicating particular verification information and/or transaction cards for a particular combination. Furthermore, the user may input information indicating the particular vendor and/or the type of transaction to be associated with the predetermined combination.

In some embodiments, and as described in more detail with respect to FIG. 6, the processor 30 may determine whether additional verification information should be acquired. For example, the processor 30 may determine that the memory of the user device does not store particular verification information for an event. In any case, the processor 30 may store an indication of the verification information to be acquired, obtained, or otherwise retrieved for executing the transaction. Furthermore, the processor 30 may utilize the indication of the verification information to be acquired for generating the transaction output as described in more detail below.

At block 80, the processor 30 selects a combination of one or more transaction cards and one or more verification information cards based on the determined vendor, user habit data, account information, or any combination thereof. As describe herein, the combination generally includes at least two combinations of information, such as transaction card information and verification information (e.g., zero transaction card information and at least two verification information, at least two transaction card information and zero verification information, or at least one transaction card information and at least one verification information). In any case, the processor 30 may select or determine the combination for executing the transaction to aid the user in executing the transaction. For example, the processor 30, at block 76, may determine that the user is at a doctor's office that the user has not previously visited. As such, the processor 30 may retrieve verification information corresponding to the type of appointment. That is, the processor 30 may retrieve health insurance information for a doctor's appointment. Alternatively, the processor 30 may retrieve dental insurance information for dentist appointment. As another non-limiting example, the processor 30 may retrieve a birth certificate and/or identification information for a government appointment (i.e., a department of motor vehicles (DMV) appointment, a marriage license appointment).

For example, the processor 30, at block 76, may determine that the potential transaction is associated with a particular vendor that may offer a rewards card (e.g. a department store, an airlines, restaurant and the like). As such, the processor 30 may access stored transaction card data associated with the user (e.g. stored in the database 14) and determine whether the stored card data includes the rewards card. In general, the "stored card data" may include data indicating the transaction cards associated with the user, such as transaction cards the user has added and/or a default card. For example, the stored card data may include a listing of each of the transaction cards, the type of transaction card (e.g., debit card or credit card, Visa Card, MasterCard, and the like), a vendor associated with the card (e.g., a rewards card for a particular restaurant, department store, airlines, and the like). Accordingly, if the stored card data includes a rewards card, the processor 30 may select the rewards card.

In some embodiments, the processor 30 may select a combination including a particular transaction card based on certain user habits or potential purchases the user is likely to make. For example, the processor 30 may determine that a user is likely to take a vacation (e.g., based on an internet search history associated with the user computing device 16). As such, the processor 30 may select a particular combination that includes the transaction card that provides a particular type of reward points (e.g., miles).

In some embodiments the processor 30 may determine whether the stored card data includes a particular rewards card associated with a vendor. In certain embodiments, the processor 30 may determine that the stored card data does not include the particular rewards card. As such, the processor 30 may cause a display of the user computing device 16 that recommends the user to sign up for a particular transaction card. In some embodiments, the processor 30 may open a web browser to a webpage associated with signing up for the particular transaction card.

A block 82, the processor 30 generates a transaction output based on the combination. In some embodiments, the transaction output may include the authorization data and/or transaction code to be utilized by the terminal to facilitate the transaction indicated at block 72. That is, the processor 30 may be capable of automatically executing a transaction with a selected combination. In some embodiments, the transaction output may be instructions that cause the processor 30 to download updated or missing documents. For example, the processor 30 may determine that a driver's license is to be included in the combination. However, the processor 30 may determine that the driver's license is missing, expired (e.g., based on driver's license information, such as the expiration date), or otherwise not available. As such, the transaction output may include instructions that cause the processor 30 to download an electronic version of the driver's license or otherwise notify the user that such verification information (i.e., driver's license) should be made available. In some embodiments, the transaction output may include the processor 30 causing a display to display a graphical user interface having a notification that generally indicates a selected transaction card. For example, the notification may include a recommendation for the user to utilize a specific card and/or sign up for a specific card. Furthermore the notification may include additional information that may help the user decide whether or not to use the selected card, such as a list of the financial benefits for the particular card or a comparison of the financial benefits associated with one or more additional cards associated with the stored card data.

In some embodiments, the transaction output may include storing the combination in the memory such that the verification data management system 12 may utilize the combination for a subsequent transaction. At least in some instances, the processor 30 may cause the display 46 to display a notification with selectable features that enables the user to confirm or deny use of the combination for subsequent transactions. Additionally, the notification may also enable the user to label the combination or otherwise indicate a vendor or transaction type associated with the combination, thereby linking the combination to the vendor or transaction type.

As one non-limiting example of an implementation of the process 70, the process 70 may aid a user in ensuring that electronic documents are downloaded to the user computing device 16 in advance of a trip. For example, at block 72, the processor 30 may receive the indication of the potential transaction by identifying a calendar entry and/or based on audio data acquired via the audio devices 44 indicating an upcoming trip (i.e., the potential transaction may be a previous transaction). That is, the processor 30 may identify keywords in a calendar entry (e.g. 'trip to San Antonio,' 'Flight Number,' 'Hotel Reservation' and the like). Accordingly, the processor 30 may determine a combination of transaction cards and/or verification information that the user may desire to have ready for the trip. As such, the processor 30 may query the stored transaction information and/or stored card information for the transaction cards and/or verification information. If the processor 30 determines that a first verification information and/or a first transaction card should be added to a combination or combined with another transaction card and/or verification information to form a combination, but the first verification information and/or the first transaction card is not stored in the memory 32, the processor 30 may query an additional application executed on the user computing device 16, such as an email application, a travel management application, and the like. That is, the transaction output may cause the processor 30 to attempt to obtain, acquire, or otherwise retrieve (e.g., by downloading) the first verification information and/or the first transaction card. Additionally or alternatively, the processor 30 may cause the display 46 to display a notification indicating that the user should download the missing document. In this way, the processor 30 may manage stored information on electronic devices, such as the user computing device 16, thereby improving the efficiency of the user.

Accordingly, the process 70 provides techniques for selecting a combination of verification information and transaction cards for executing a potential transaction based on user activity data, user habit data, account information associated with stored card data, or any combination thereof. In this way, the process 70 may provide improved financial benefits to the user, while also improving the efficiency of executing transactions.

FIG. 5 illustrates an example process 90 that may be employed by the processor 30 of the verification data management system 12 to manage accessible transaction information that is available on the card. For example, the steps of the process 90 may be stored in memory 32, the storage 34 and/or the memory 58. Before proceeding, it should be noted that the process 90 described below is described as being performed by the processor 30 of the verification data management system 12, but the process 90 may be performed by other suitable computing devices. Although described in a particular order, which represents a particular embodiment, it should be noted that the process 90 may be performed in any suitable order. Additionally, embodiments of the process 90 may omit process blocks and/or include additional process blocks.

Referring now to FIG. 5, at block 92, the processor 30 receives an indication of a modification to a group of cards corresponding to a user. For example, the indication may indicate that user desires to add a new card to the group of cards, remove one or more existing cards, edit information associated with one or more cards, or update a preference of cards.

At block 94, the processor 30 updates stored card information based on the indication. For example, if the indication indicates that a new card should be added to the stored card data, the processor 30 may add new card to the stored card data. As another non-limiting example, if the indication indicates that a card should be removed from the stored card data, the processor 30 may remove the card from the stored card data. As another non-limiting example, if the indication indicates that a default card for executing transactions should be changed, the processor 30 my update the stored card data with a modified default card. Again, it should be noted that cards are merely examples of any of various tokens that may be employed for transactions, authentication, information provision, and so forth. For example, other financial-based, authentication-based, and information-based tokens are generally represented by the referenced cards.

At block 96, the processor 30 transmits an indication of the updated stored card data. For example, the processor 30 may cause a display of the user computing device 16 to display notification indicating the update to the stored card data, such as the new card added, the card removed, the updated default card, updated information of one or more transaction cards corresponding to the stored card data, and the like.

Accordingly, the process 90 may facilitate managing the verification data management system 12 by providing techniques for a user to update information related to the stored card data.

FIG. 6 illustrates an example process 100 that may be employed by the processor 30 of the verification data management system 12 to identify verification information and/or transaction cards to update. For example, the steps of the process 100 may be stored in memory 32, the storage 34 and/or the memory 58. Before proceeding, it should be noted that the process 100 described below is described as being performed by the processor 30 of the verification data management system 12, but the process 100 may be performed by other suitable computing devices. Although described in a particular order, which represents a particular embodiment, it should be noted that the process 100 may be performed in any suitable order. Additionally, embodiments of the process 100 may omit process blocks and/or include additional process blocks.

Referring now to FIG. 6, at block 102, the processor 30 receives an indication of a potential transaction. In general, block 102 may be performed in a generally similar manner as described with respect to block 72 of FIG. 4. At block 104, the processor 30 determine a stored combination of transaction cards and verification information based on the potential transaction in a generally similar manner as described with respect to block 80 of FIG. 4. For example, the processor 30 may retrieve stored combinations of one or more transaction card information and verification information that may be linked, associated, or otherwise correspond to a transaction based on the type of transaction (e.g., a medical transaction type, a department store transaction type, a dental transaction type). That is, and as described in more detail with respect to FIG. 6, the verification data management system 12 may be capable of storing and managing predetermined combinations (e.g., set up by a user or determined by the processor 30 based on user activity data).

At block 106, the processor 30 determines an additional verification information to add to the combination. In general, to determine whether additional verification information is to be added to the combination, the processor 30 may determine whether a previous transaction with the vendor associated with the transaction has occurred within a time range (e.g., 30 days, 1 year, 2 years, or greater than 2 years). If the previous transaction has not occurred within the time range, or otherwise has not occurred, the processor 30 may determine that it may be desirable to include additional verification information. Accordingly, the processor 30 may acquire, obtain, or otherwise retrieve the additional verification information as generally described herein. For example, the processor 30 may generate a transaction output that causes a user computing device 16 to obtain the additional verification information. In some embodiments, the processor 30 may cause a display of a device to display a notification indicating that the user should upload an electronic version of the verification information.

At block 108, the processor 30 generates a transaction output including the stored combination and the additional verification information in a generally similar manner as described with respect to block 82 of FIG. 4.

Accordingly, the process 100 may facilitate managing the verification data management system 12 by providing techniques for a user to update information related to the stored card data.

As described herein, the verification data management system 12 may also be implemented on a user computing device 16. For example, the verification data management system 12 may be an application stored on a memory of a user device, such a smart phone or tablet, and executable by a processor of the user computing device 16. In such embodiments, the verification data management system 12 may be configured to cause the display of the user device to display a graphical user interface (GUI) that enables the user to perform the operations described herein.

Figure 7:
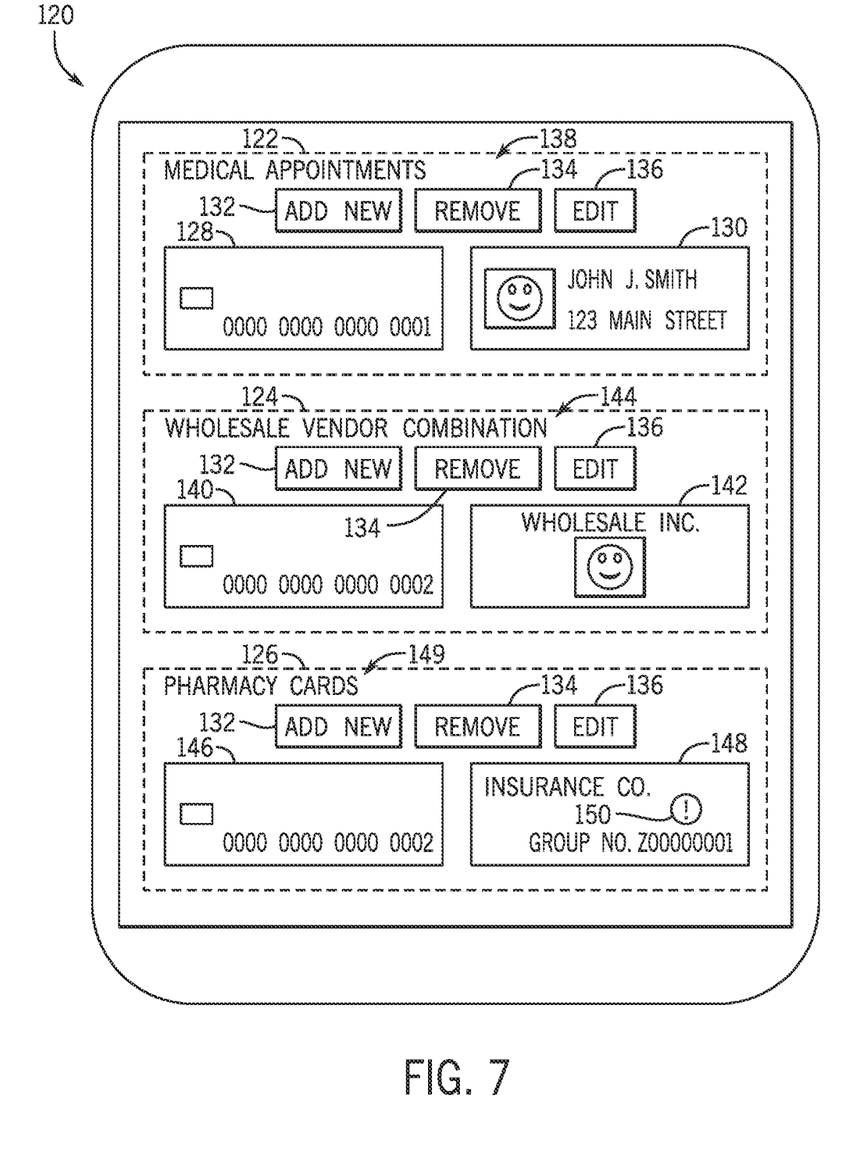
FIG. 7 illustrates a graphical user interface (GUI) of a device for managing combinations of transaction card information and verification information, in accordance with embodiments described herein.

To illustrate this, FIG. 7 is a layout of a GUI 120 that may be displayed on a user computing device 16 to facilitate managing transaction authorization, in accordance with an embodiment of the present disclosure. For example, the GUI 120 may be used to manage a combination of transaction cards and/or verification information.

In the depicted embodiment, the GUI 120 includes a first default combination section 122, a second default combination section 124, and a third default combination section 126. Each default combination section (e.g., the first default combination section 122, the second default combination section 124, and the third default combination section 126) generally depicts a visualization corresponding to a particular credit card (e.g., one of the cards 66 as described with respect to FIG. 3) and a particular verification information (e.g., one of the verification information card 68 as described with respect to FIG. 3). In each illustrated example, a single credit card and a single verification card is shown; however, in other embodiments, numerous combinations with differing numbers of cards/information may be provided. Further, detailed information on each may be displayed when selected. For example, if a birth certificate is illustrated in this view, it can be selected (e.g., via a touchscreen or the like) to view information provided by the birth certificate more easily, which may include providing a view of an actual copy that can be magnified electronically for viewing purposes.

As illustrated, the first default combination section 122 displays a first card visualization 128, which corresponds to a first default credit card, and a first verification information 130, which corresponds to a first verification information. Additionally, the first default combination section 122 includes selectable features 132, 134, and 136, which may be implemented as a soft button or other selectable feature that a user may select to perform a certain action. In this example, the selectable features 132, 134, and 136 may enable a user to edit information associated with the verification information and/or transaction card corresponding to the first default combination section 122. As illustrated, the first default combination section 122 includes an indicator 138 (e.g., 'Medical Appointments') that generally indicates a type of transaction or vendor for using the first default combination section 122. For example, if the processor 30 determines that the user is a doctor's office, the processor 30 may retrieve the transaction card and verification data corresponding to the first default combination section 122 to facilitate the transaction. In some embodiments, the GUI 120 may include selectable features that enable a user to add additional default combination sections corresponding to a different combination of verification information and/or transaction cards.

As illustrated, the second default combination section 124 displays a second card visualization 140, which corresponds to a second default credit card, and a second verification information visualization 142, which corresponds to a second verification information. Additionally, the second default combination section 124 includes selectable features 132, 134, and 136, which each may be implemented as a soft button or other selectable feature that a user may select to perform a certain action, as generally described with respect to FIG. 5. In this example, the selectable features 132, 134, and 136 may enable a user to edit information associated with the default credit card corresponding to the verification information and/or transaction card corresponding to the second default combination section 124. As illustrated, the second default combination section 124 includes an indicator 144 (e.g., 'Wholesale Vendor Combination) that generally indicates a type of transaction or vendor for using the second default combination section 124. For example, if the processor 30 determines that the user is at a wholesale store corresponding to a particular vendor, the processor 30 may retrieve the transaction card and verification data corresponding to the first default combination section to facilitate the transaction. As such, the verification data management system 12 may facilitate transactions even when the user is traveling.

As illustrated, the third default combination section 126 displays a third card visualization 146, which corresponds to a third default credit card, and a third verification information visualization 148, which corresponds to a third verification information. Additionally, the third default combination section 126 includes selectable features 132, 134, and 136, which may be implemented as a soft button or other selectable feature that a user may select to perform a certain action, as generally described with respect to FIG. 5. In this example, the selectable features 132, 134, and 136 may enable a user to edit information associated with the default credit card corresponding to the verification information and/or transaction card corresponding to the third default combination section 126. As illustrated, the third default combination section 126 includes an indicator 149 (e.g., 'Pharmacy Cards') that generally indicates a type of transaction or vendor for using the third default combination section 126. For example, if the processor 30 determines that the user is at a pharmacy store corresponding to a particular vendor, the processor 30 may retrieve the transaction card and verification data corresponding to the first default combination section to facilitate the transaction.

Additionally, the depicted embodiment includes an alert notification 150. In general, the alert notification 150 may indicate certain information or alerts related to a particular transaction card and/or verification information. For example, the alert may indicate where a balance associated with the transaction card is within a threshold spending goal, beyond the spending goal, the card is about to expire, a potential fraudulent transaction has occurred, a statement balance is due, and the like.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform) ing (a function) . . . " or "step for (perform) ing (a function) . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A system, comprising:
a processor;
communication circuitry configured to be in communication with a retail transaction system;
a tangible, non-transitory, computer readable medium, comprising instructions that cause the processor to:
  receive an electronic indication of a potential transaction to occur using an electronic device of a user;
  receive location data and calendar data from the electronic device of the user, wherein the calendar data comprises a plurality of calendar entries indicating appointments of the user;
  analyze the location data and the calendar data;
  determine that the location data corresponds to a calendar entry of the plurality of calendar entries based on analyzing the location data and the calendar data;
  identify an appointment type of the calendar entry based on one or more keywords of the calendar entry in response to determining that the location data corresponds to the calendar entry;
  access stored card data based on the appointment type, wherein the stored card data comprises data for a plurality of transaction cards associated with the user;
  determine a combination of a transaction card of the plurality of transaction cards and verification information for executing the potential transaction based on the stored card data, wherein the verification information is based on the appointment type;

query a memory of an electronic device associated with the user in response to determining the combination of the transaction card of the plurality of transaction cards and verification information for executing the potential transaction;

determine that the verification information is missing from the memory of the electronic device based on the query;

automatically identify an application on the electronic device, wherein the application is configured to access the verification information;

retrieve the verification information by communicating with a storage component via the application, wherein the storage component is separate from the memory of the electronic device;

store the verification information on the memory of the electronic device;

generate a transaction output based on the combination including the stored verification information, wherein the transaction output comprises authorization data, a transaction code, or both to automatically execute the potential transaction; and in response to receiving the electronic indication of the potential transaction, instruct the communication circuitry to communicate the transaction output to an electronic device, wherein the transaction output causes the electronic device to display a visualization corresponding to the combination.

2. The system of claim 1, wherein the instructions are configured to cause the processor to select the calendar entry of the plurality of calendar entries based on time data for the potential transaction corresponding to time data for the calendar entry.

3. The system of claim 1, wherein the verification information comprises passport information, driver's license information, birth certificate information, a social security number, or a combination thereof.

4. The system of claim 1, wherein the electronic indication is received from a retail point of sale device.

5. The system of claim 1, comprising a display to generate a graphical user interface (GUI) indicating the combination.

6. The system of claim 1, wherein the plurality of transaction cards comprise a credit card, a debit card, a cash card, or a combination thereof.

7. The system of claim 1, wherein the transaction output comprises the authorization data associated with the transaction card of the combination sent to a terminal device associated with the retail transaction system.

8. A method, comprising:
storing card information for a plurality of transaction cards in a memory of a storage component;
storing verification information for use with the card information in the memory of the storage component;
storing a plurality of combinations of information comprising portions of the card information and the verification information;
receiving an electronic indication of a potential transaction to occur using an electronic device of a user;
receiving location data and calendar data from the electronic device of the user, wherein the calendar data comprises a plurality of calendar entries indicating appointments of the user;
analyzing the location data and the calendar data;
determining that the location data corresponds to a calendar entry of the plurality of calendar entries based on analyzing the location data and the calendar data;

identifying an appointment type of the calendar entry based on one or more keywords of the calendar entry in response to determining that the location data corresponds to the calendar entry;

accessing stored card data based on the appointment type, wherein the stored card data comprises data for a plurality of transaction cards associated with the user;

determining a combination of information of the plurality of combinations of information based on the stored card data, wherein the combination of information comprises at least one transaction card and at least one verification information;

querying a memory of an electronic device associated with the user in response to determining the combination of information;

determining that the at least one verification information is missing from the memory of the electronic device based on the query;

automatically identifying an application on the electronic device, wherein the application is configured to access the at least one verification information;

retrieving the at least one verification information by communicating with a storage component via the application, wherein the storage component is separate from the memory of the electronic device;

after retrieving the at least one verification information, storing the at least one verification information on the memory of the electronic device;

generating a transaction output based on the combination including the stored verification information, wherein the transaction output comprises authorization data, a transaction code, or both to automatically execute the potential transaction;

displaying a visualization corresponding to the combination of information including at least one of the stored verification information on a display of an electronic device; and providing the combination of information via the memory in response to a detection of the potential transaction.

9. The method of claim 8, further comprising:
receiving user activity data;
determining an additional verification information to add to the combination of information based on the user activity data; and
providing the combination of information including the additional verification information as an output.

10. The method of claim 8, wherein the determining of the combination of information is performed via a mobile device.

11. A system, comprising:
a processor;
a tangible, non-transitory, computer-readable medium, comprising instructions that cause the processor to:
receive an electronic indication of a potential transaction to occur using an electronic device of a user;
receive location data from the electronic device of the user;
determine a time period corresponding to the potential transaction;
receive user habit data indicating a vendor correlated with purchases during a time range;
determine that the time period of the potential transaction is within the time range associated with the vendor;
determine a transaction type of the potential transaction based on the vendor;

retrieve a plurality of combinations of information based on the transaction type, wherein each combination of the plurality of combinations of information includes data from one or more transaction tokens and data from one or more verification tokens;

select a combination of information from the plurality of combinations of information based on the transaction type and time period being within the time range;

querying a memory of an electronic device associated with the user in response to selecting the combination of information;

determining that a verification token of the selected combination is missing from the memory of the electronic device based on the query;

automatically identifying an application on the electronic device, wherein the application is configured to access the verification token;

retrieving the verification token by communicating with a storage component via the application, wherein the storage component is separate from the memory of the electronic device;

storing the verification token on the memory of the electronic device;

generating a transaction output based on the selected combination of information including the stored verification token, wherein the transaction output comprises authorization data, a transaction code, or both to automatically execute the potential transaction; and adjust operation of the electronic device based on the transaction output, wherein the transaction output causes the electronic device to display a visualization corresponding to the combination of information.

12. The system of claim 11, wherein the data from the one or more verification tokens comprises electronic ticket data associated with the potential transaction.

13. The system of claim 11, wherein the data from the one or more verification tokens comprises identification information associated with the user.

14. The method of claim 8, further comprising communicating transaction information to a point of sale device based on the combination of information.

15. The system of claim 11, wherein the instructions are configured to cause the processor to communicate transaction information to a point of sale device.

16. The method of claim 8, further comprising:
determining that the combination of information comprises outdated information; and
providing a visualization indicating the outdated information.

17. The method of claim 8, wherein retrieving the verification information from a storage component comprises downloading the verification via a cloud storage.

* * * * *